(No Model.)

E. E. THOMAS.
FRUIT DIPPER.

No. 482,283. Patented Sept. 6, 1892.

Witnesses:
J. T. Rouse
J. A. Bayless

Inventor,
Edward E. Thomas
By Dewey & Co.
Attys

UNITED STATES PATENT OFFICE.

EDWARD E. THOMAS, OF SAN JOSÉ, CALIFORNIA.

FRUIT-DIPPER.

SPECIFICATION forming part of Letters Patent No. 482,283, dated September 6, 1892.

Application filed April 13, 1892. Serial No. 429,048. (No model.)

*To all whom it may concern:*

Be it known that I, EDWARD E. THOMAS, a citizen of the United States, residing at San José, Santa Clara county, State of California, have invented an Improvement in Fruit-Dippers; and I hereby declare the following to be a full, clear, and exact description of the same.

My invention relates to a novel device for dipping fruit. It is especially applicable for the handling of such fruit as prunes.

It consists of a peculiarly-shaped networkwheel rotating within a suitable case and adapted to receive the fruit upon one side, carry it down into the water or solution, and discharge it upon the opposite side.

Figure 1:
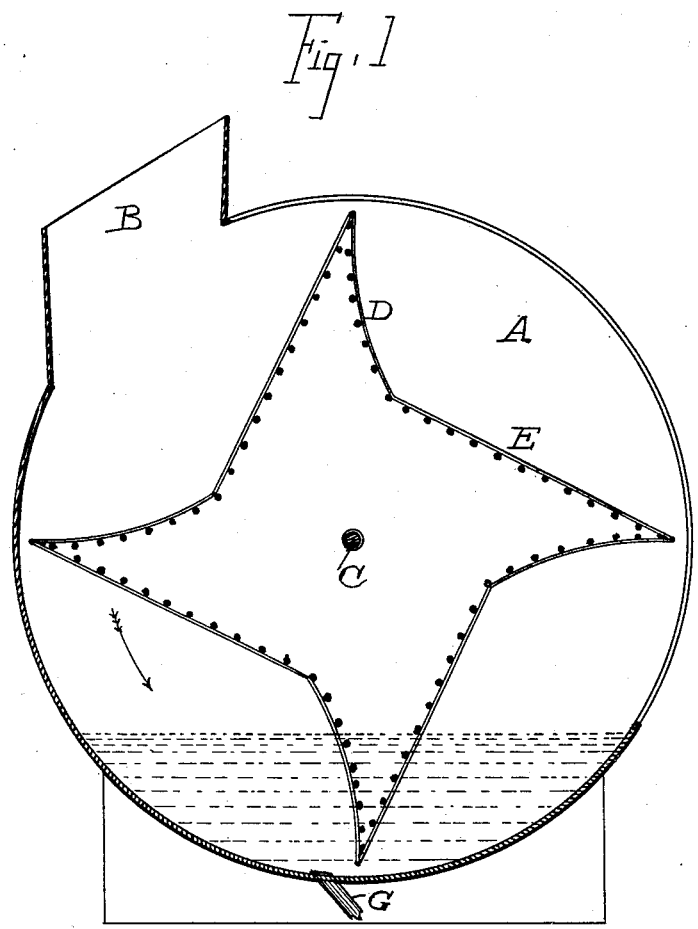
Figure 2:
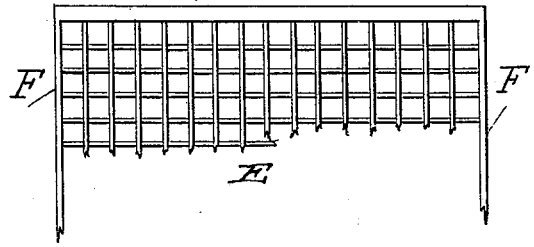

In the accompanying drawings, Figure 1 is a transverse vertical section of the case and wheel. Fig. 2 is a part of the face E of the wheel.

In handling prunes the fresh fruit when it arrives from the field is first graded and is then dipped in a strong caustic solution to cut the skins, then passed from this solution into a clear-water washing solution, and thence to the trays upon which the fruit is dried. After drying it is again returned to the house and is then passed through the steam and hot water for the purpose of cleaning and brightening it. My apparatus is designed to carry the fruit through these various dippings and to economize in the time and labor required for these repeated handlings.

A is an exterior case, which may be of any suitable dimensions, and has a hopper or delivery-chute B, through which the fruit passes from a grader into this apparatus.

The dipping-wheel is mounted on a horizontal shaft C, extending through the sides of the case and having a suitable gear or pulley wheel upon the outer end, through which motion is transmitted to rotate the wheel.

The face of the wheel is peculiarly constructed. It consists of short curved surfaces D and straight surfaces E, formed of an open network or screen, these surfaces extending from one edge F to the adjacent one to form network-buckets.

In the present case I have shown the wheel made with four projecting edges parallel with the axis, each edge being united with the next adjacent one by the curved and straight surfaces, as described. The short curved surface receives the fruit, which is delivered into the apparatus through the delivery-chute B, and carries it down into the curved lower portion of the case, which forms the dippingtrough and contains the liquid into which the fruit is to be dipped. This liquid, as before described, is in the first case a caustic solution and in the second case washing-water, and the last dipping takes place in boiling water, into which jets of steam are admitted to keep up the temperature and to assist in the cleansing and softening of the fruit.

I preferably deliver the steam through the bottom of the casing through jet-tubes G and incline the jet-tubes toward the rear side of the casing, so that the ebullition will take place in that direction, and thus correct any tendency of the water to boil over and be thrown out through the lower front side, through which the fruit is discharged.

The peculiar construction of this wheel is such that the fruit falling upon the short curved surfaces and being near the outer periphery of the wheel assists by its weight to turn the wheel, so that but little power is necessary to carry the fruit into the liquid in which it is submerged. The adjacent straight surface then takes the fruit and sweeps it through the liquid up to the delivery edge of the casing, and by reason of its peculiar shape with relation to the center of the apparatus it makes such an inclination that the fruit will be discharged from the apparatus without any danger of clogging or being carried up by the rotation of the wheel.

The length of the wheel will depend upon the amount of fruit to be handled, and it will be manifest that its capacity will be regulated by the length.

Although I have described the wheel as being made with these peculiar surfaces, it will be manifest that they may be varied considerably and yet perform the work in a satisfactory manner.

Having thus described my invention, what I claim as new, and desire to secure by Letters Patent, is—

1. A fruit-dipping apparatus consisting of a wheel rotating within a casing having a dipping-trough in the lower portion, said wheel having buckets formed with curved surfaces D and straight surfaces E, both composed of open network, substantially as herein described.

2. An apparatus for dipping fruit, consisting of a casing having a dipping-trough in the lower part, an open front from which the fruit is delivered, a closed back, and a supply chute or hopper at the upper back portion, in combination with a wheel journaled within the casing, having network-buckets adapted to receive the fruit which is delivered through the supply-chute and carried down into the liquid in the trough, and corresponding network-extensions from the rear of said buckets by which the fruit is swept out and discharged from the front of the machine, substantially as herein described.

In witness whereof I have hereunto set my hand.

EDWARD E. THOMAS.

Witnesses:
S. H. NOURSE,
J. A. BAYLESS.